Patented Dec. 25, 1934

1,985,230

UNITED STATES PATENT OFFICE 1,985,230

MANUFACTURE OF MODIFIED OIL PRODUCTS FROM FATTY OILS

László Auer, Manchester, England, assignor to J. Randolph Newman, Washington, D. C., as trustee No Drawing. Application April 26, 1928, Serial No. 273,159. In Hungary April 26, 1927

7 Claims. (Cl. 106—23)

This invention relates to the manufacture of modified oil products from fatty oils and it comprises methods of making such products wherein an alcoholic solution of an alkali metal alcoholate, advantageously sodium amylate, is mixed with the fatty oil and the solvent is subsequently removed, forming a dispersion of said metal alcoholate in said fatty oil and forming a modified oil product, the oil product sometimes being also vulcanized in a suitable manner; and it comprises the modified oil products so obtained; all as more fully hereinafter set forth and as claimed.

In my copending application Ser. No. 143,786, filed October 23, 1926, I disclose several processes based on my discovery that by the dispersion of small quantities of electrolytes in organic isocolloid containing unsaturated carbon compounds such as mineral oils containing naphthenic acids, fatty oils, resins, asphalts, goudrons, tar distillation residues and the like, the physical properties of these substances undergo considerable change, leading to new products or products in a new state of aggregation and possessing new properties.

The present invention is an improvement upon and a further development of my prior inventions disclosed in said copending application.

In the present processes, an alkali metal is added to a substantially anhydrous alcohol to produce an alcohol solution of an alkali metal alcoholate. The solution thus obtained is mixed with the fatty oil to be modified. Sodium and amyl alcohol are advantageous.

If desired, I may separate the alcoholic solvent from the mixture after the process has proceeded to a sufficient extent and for such separation I may use a distillation process, centrifuging, extraction or pressing, according to the nature of the materials and solvents used. It may also be desirable in many cases to remove the excess of electrolytes by washing.

When it is required to obtain products possessing greater resistance to heat and weather, I may further modify the modified bodies thus obtained by vulcanizing them with sulphur or with sulphur-containing compounds such as sulphur chloride. This treatment may follow the main reaction as a separate phase, or may be carried out simultaneously with the main reaction. The vulcanization may be accelerated by the use of vulcanization accelerators commonly employed in the rubber industry, such for instance as hexamethylenetetramine, analine, diphenylguanidine and the like.

Further the products made in accordance with the foregoing process may be converted into emulsions by treating with water in the presence of suitable emulsifying agents, such as, ammonium linoleate, sodium stearate and other soaps, sulphonated fatty acids, organic bases and other similar materials.

Products made in accordance with this invention can be utilized in the production of varnishes, linoleums, rubber, candles, soap and in any industry utilizing plastic masses. For such purposes suitable filling materials, pigments, solvents and the like may be incorporated with the products prepared according to my invention.

My invention is illustrated but not limited by the following example in which the parts are parts by weight:—

*Example.*—2 parts of metallic sodium are dissolved in 20 parts amyl alcohol previously freed from water. The solution of sodium amylate so obtained is mixed with 100 parts Chinese wood oil, and from the resulting jelly-like product the excess of alcohol is carefully distilled off. The residual material is maintained for ½ hour at 160° C. after being mixed with 20 parts of iron oxide and 7 parts of sulphur. At the end of this time the product is pressed in moulds in a semi-hot state. Iron oxide in this example represents a filling material.

In the following claims, by the expression "solutions", I want to include both true solutions and colloidal solutions.

What I claim and desire to secure by Letters Patent is:

1. In the manufacture of modified bodies from fatty oils, the process which comprises adding an alkali metal to a substantially anhydrous alcohol to produce an alcohol solution of an alkali metal alcoholate, mixing said solution with a fatty oil, distilling away the said alcohol from the mixture and recovering the modified body thus produced.

2. The process of claim 1 in which the said substantially anhydrous alcohol is amyl alcohol.

3. The process of claim 1 in which said alkali metal alcoholate is sodium amylate.

4. In the manufacture of modified bodies from fatty oils, the process which comprises adding metallic sodium to amyl alcohol to produce an amyl alcohol solution of sodium amylate, mixing said solution with Chinese wood oil, distilling away the amyl alcohol from the mixture recovering the modified body thus produced.

5. As an improvement in the manufacture of thickened oil products from a drying fatty oil, the process which comprises adding about 2 parts of an alkali metal to about 20 parts of a substantially anhydrous alcohol, mixing the alcoholic solution of the metallic alcoholate thus obtained with about 100 parts of said fatty oil, maintaining the mixture under suitable conditions until a jelly-like product is obtained, and then distilling off the excess alcohol and recovering the thickened oil product thus obtained.

6. In the manufacture of vulcanized and modified bodies from Chinese wood oil, the process which comprises dissolving 2 parts of metallic sodium in about 20 parts of amyl alcohol which is substantially anhydrous, mixing the alcohol solution of sodium amylate thus produced with 100 parts of Chinese wood oil, carefully distilling off the excess alcohol from the modified jelly-like product thus produced, mixing the modified product with about 7 parts of sulphur and 20 parts of iron oxide and heating the mixture thus produced to a temperature of about 160° C.

7. The process of claim 1 wherein the modified body so produced is subsequently vulcanized with sulphur to further modify it.

LÁSZLÓ AUER.